US010949110B2

(12) United States Patent
Secatch et al.

(10) Patent No.: US 10,949,110 B2
(45) Date of Patent: Mar. 16, 2021

(54) CONFIGURABLE MAPPING SYSTEM IN A NON-VOLATILE MEMORY

(71) Applicant: Seagate Technology LLC, Cupertino, CA (US)

(72) Inventors: Stacey Secatch, Niwot, CO (US); David W. Claude, Loveland, CO (US); Steven S. Williams, Longmont, CO (US); Jeff Rogers, Dunlap, IL (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/023,199

(22) Filed: Jun. 29, 2018

(65) Prior Publication Data
US 2020/0004450 A1 Jan. 2, 2020

(51) Int. Cl.
G06F 3/06 (2006.01)
G06F 13/16 (2006.01)
G06F 13/42 (2006.01)

(52) U.S. Cl.
CPC .......... G06F 3/0644 (2013.01); G06F 3/0604 (2013.01); G06F 3/0634 (2013.01); G06F 3/0679 (2013.01); G06F 13/1668 (2013.01); G06F 13/4282 (2013.01); G06F 2213/0026 (2013.01)

(58) Field of Classification Search
None
See application file for complete search history.

(56) References Cited

U.S. PATENT DOCUMENTS

| 7,873,619 | B1* | 1/2011 | Faibish | G06F 16/13 707/705 |
| 9,900,397 | B1* | 2/2018 | Cope | H04L 67/2842 |
| 2003/0163630 | A1* | 8/2003 | Aasheim | G06F 12/0246 711/103 |
| 2013/0080732 | A1* | 3/2013 | Nellans | G06F 12/0246 711/206 |
| 2014/0059277 | A1* | 2/2014 | Chung | G06F 3/0664 711/103 |
| 2015/0012735 | A1 | 1/2015 | Tamir et al. | |
| 2018/0095915 | A1 | 4/2018 | Prabhakar et al. | |
| 2018/0246821 | A1* | 8/2018 | Kanno | G06F 13/1668 |
| 2019/0227921 | A1* | 7/2019 | Frolikov | G06F 3/061 |
| 2019/0251039 | A1* | 8/2019 | Modi | G06F 3/0604 |

* cited by examiner

Primary Examiner — Tracy C Chan
(74) Attorney, Agent, or Firm — Hall Estill Attorneys at Law

(57) ABSTRACT

Apparatus and method for managing metadata in a data storage device, such as a solid-state drive (SSD). In some embodiments, a non-volatile memory (NVM) includes a population of semiconductor memory dies. The dies are connected a number of parallel channels such that less than all of the semiconductor dies are connected to each channel. A controller circuit apportions the semiconductor memory dies into a plurality of die sets, with each die set configured to store user data blocks associated with a different user. The controller circuit subsequently rearranges the dies into a different arrangement of die sets so that at least one die is migrated from a first dies set to a second die set. A map manager circuit is configured to establish an array of pointers in a memory to identify contiguous portions of map metadtata that describe user data stored in the at least one migrated die.

22 Claims, 6 Drawing Sheets

_US 10,949,110 B2_

CONFIGURABLE MAPPING SYSTEM IN A NON-VOLATILE MEMORY

SUMMARY

Various embodiments of the present disclosure are generally directed to the management of metadata in a memory, such as but not limited to a flash memory in a solid state drive (SSD).

In accordance with some embodiments, Apparatus and method for managing metadata in a data storage device, such as a solid-state drive (SSD). In some embodiments, a non-volatile memory (NVM) includes a population of semiconductor memory dies. The dies are connected using a number of parallel channels such that less than all of the semiconductor dies are connected to each channel. A controller circuit apportions the semiconductor memory dies into a plurality of die sets, with each die set configured to store user data blocks associated with a different user. The controller circuit subsequently rearranges the dies into a different arrangement of die sets so that at least one die is migrated from a first die set to a second die set. A map manager circuit is configured to establish an array of pointers in a memory to identify contiguous portions of map metadata that describe user data stored in the at least one migrated die.

These and other features which may characterize various embodiments can be understood in view of the following detailed discussion and the accompanying drawings.

DETAILED DESCRIPTION

Figure 1:
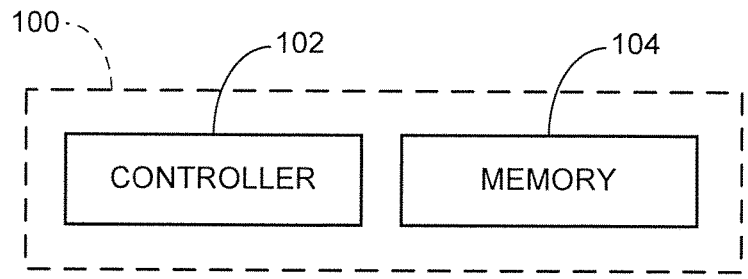
FIG. 1 provides a functional block representation of a data storage device in accordance with various embodiments.

Solid state drives (SSDs) are data storage devices that store user data in non-volatile memory (NVM) made up of an array of solid-state semiconductor memory cells. SSDs usually have an NVM module and a controller. The controller directs the transfer of user data between the NVM and a host device. The NVM will usually be NAND flash memory, but other forms of solid-state memory can be used.

The NVMe specification is an industry adopted standard that describes various interface and operational characteristics of SSDs and other NVM storage devices. The NVMe specification allows different portions of an SSD storage capacity to be assigned to different users for concurrent access and use via one or more PCIe (Peripheral Component Interface Express) interfaces. The portion of the capacity assigned to each NVMe user is referred to as an "NVM set" or "namespace." The specification provides that NVM sets are logically separate and may be physically separate as well, although at present the specification does not go into detail on how an NVM set may be physically separated from the rest of the SSD memory.

Metadata is often generated and used to describe and control the data stored to an SSD. The metadata takes the form of one or more map structures that track the locations of data blocks written to various locations within the flash memory. Because the map structures enable the system to locate, update and retrieve user data blocks, significant system resources are applied to maintain the integrity of the map. As overall data storage capacities continue to increase with successive generations of storage devices, the amount of map data needed to describe the memory space will tend to grow at a corresponding rate, exasperating the ability to efficiently manage the metadata while maintaining deterministic I/O performance.

Various embodiments of the present disclosure are generally directed to an apparatus and method for managing metadata in an NVM storage device. As explained below, some embodiments provide a solid state drive (SSD) with a controller circuit and a memory coupled to the controller circuit. The memory includes a plurality of semiconductor dies that provide flash memory cells arranged into various substructures such as pages, erasure blocks, garbage collection units (GCUs), planes, etc.

The controller circuit communicates with the dies using a number of channels, or lanes, with multiple dies connected to each channel. The dies are grouped into a number of NVM sets, each having a set of dies connected to an associated group of channels. It is contemplated albeit not necessarily required that each die set will utilize less than all of the available channels.

The controller circuit partitions the map metadata into separate and distinct map data sets, with each map data set describing a different die set. Each map data set, also referred to as a map portion, includes a forward map that provides a flash transition layer (FTL) to relate logical addresses of various data blocks to physical addresses at which the data blocks are stored in the respective die set. The respective map data sets may be physically stored in the associated die sets so that each die set stores the map set that describes the user data stored to that die set.

The sets are configurable so that different numbers and sizes of die sets can be implemented over time to accommodate different user requirements. The number of sets that will be used by a particular SSD is not always known during manufacturing, so a flexible mapping system is provided to allow changes to the numbers of sets during field operation. Using a single build configuration during manufacturing (e.g., a single set, etc.) can facilitate consolidated factory processing and customer testing.

As explained below, at appropriate times such as device initialization, the total capacity of the drive will be divided among the requested number of sets. Each set will have a distinct copy of a forward map for that set.

For each configured die set, a run-time volatile version of the forward map will be placed in local volatile memory such as DRAM. The actual location of each of these map portions relative to the other map portions within the memory is not relevant to the operational firmware. All of the map portions could be contiguous to one another or in entirely separate locations within the local memory.

For each set, the non-volatile (NAND) versions of the map portions will also be placed in contiguous NVM. This allows for minimal flash access operations when reading the map during power on recovery. Depending on the storage locations within the respective sets, the map portions may be able to be loaded in parallel to the volatile memory.

The system controller (e.g., firmware) will maintain an internal array of pointers with the number of entries sized by the maximum supported number of sets. During a loading process, for each die set, a copy of the map is loaded from NAND into DRAM. As this happens, the pointers are updated with the starting location of the DRAM copy. The firmware then accesses the map entries as if the map portions were arranged as a simple build time populated array.

The flexibility of the system allows existing map data to be associated with new sets in a fast and efficient manner. Efficient power down and power up operations are carried out within the existing power and time budgets. The SSD or other data storage device can efficiently rearrange the various dies into new sets without significant reorganizational efforts being applied to the map metadata. For example, when a selected die is moved from a first set to a second set, the map metadata for the selected die can still be handled as before with the updated pointers indicating the locations and status of the metadata.

These and other features and advantages of various embodiments will be understood beginning with a review of FIG. 1 which shows a functional block diagram of a data storage device 100. The device 100 has a controller 102 and a memory module 104.

The controller block 102 represents a hardware based and/or programmable processor based circuit configured to provide top level communication and control functions. The memory module 104 includes solid state non-volatile memory (NVM) for the storage of user data from a host device.

Figure 2:
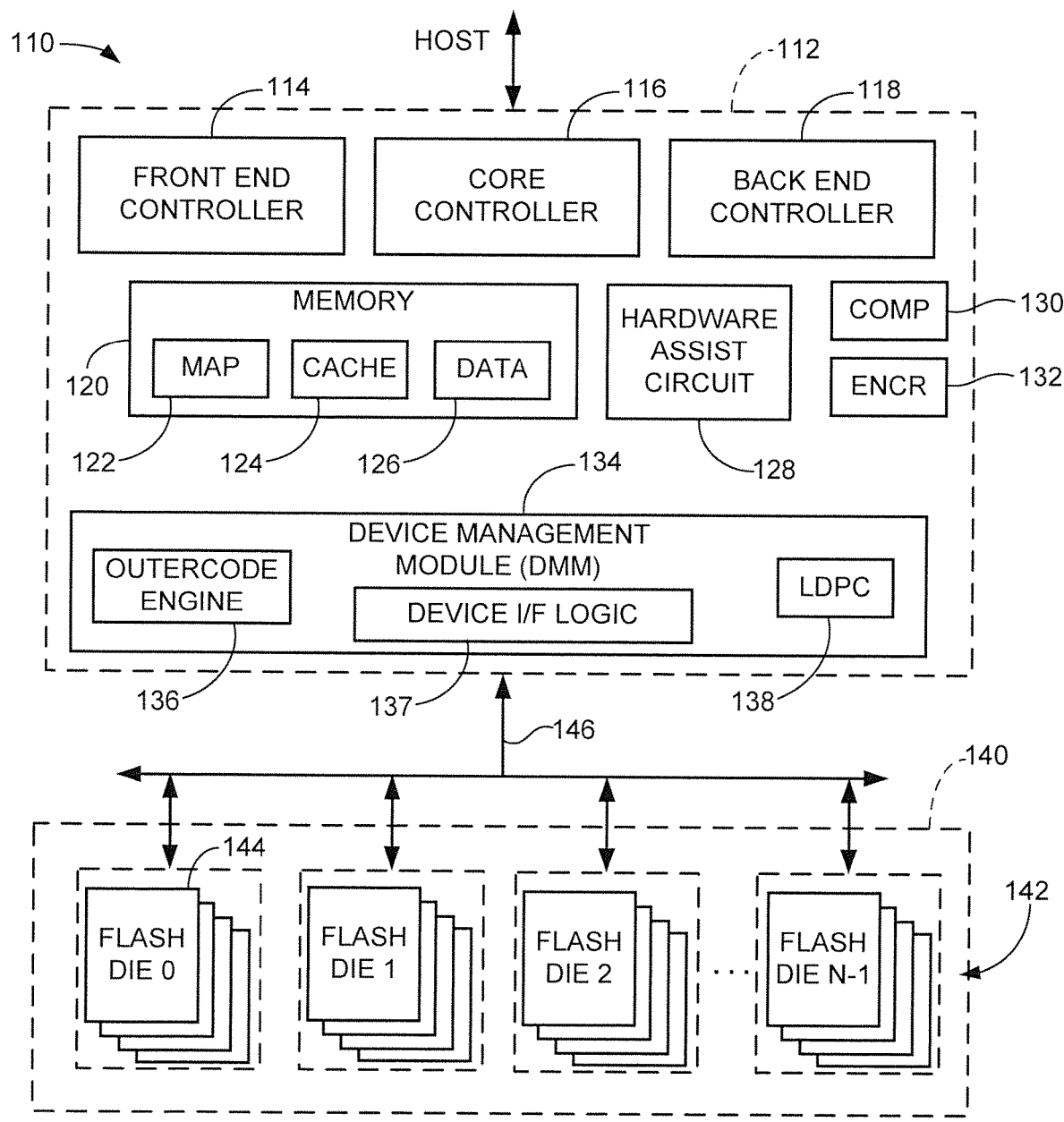
FIG. 2 shows aspects of the device of FIG. 1 characterized as a solid state drive (SSD) in accordance with some embodiments.

FIG. 2 shows a data storage device 110 as a particular embodiment of the device 100 in FIG. 1. The device 110 is configured as a solid state drive (SSD) that communicates with one or more host devices via one or more Peripheral Component Interface Express (PCIe) ports. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVM sets (die sets) for use in the storage of data. Each NVM set may form a portion of an NVMe namespace that may span multiple SSDs or be contained within a single SSD.

The SSD 110 includes a controller circuit 112 with a front end controller 114, a core controller 116 and a hack end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 112, such as a data compression block 130 and an encryption block 132. The data compression block 130 applies lossless data compression to input data sets during write operations, and subsequently provides data de-compression during read operations. The encryption block 132 provides any number of cryptographic functions to input data including encryption, hashes, decompression, etc.

A device management module (DMM) 134 supports back end processing operations and may include an outer code engine circuit 136 to generate outer code, a device I/F logic circuit 137 and a low density parity check (LDPC) circuit 138 configured to generate LDPC codes as part of the error detection and correction strategy used to protect the data stored by the SSD 110.

A memory module 140 corresponds to the memory 104 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via a number of channels (lanes) 146.

Figure 3:
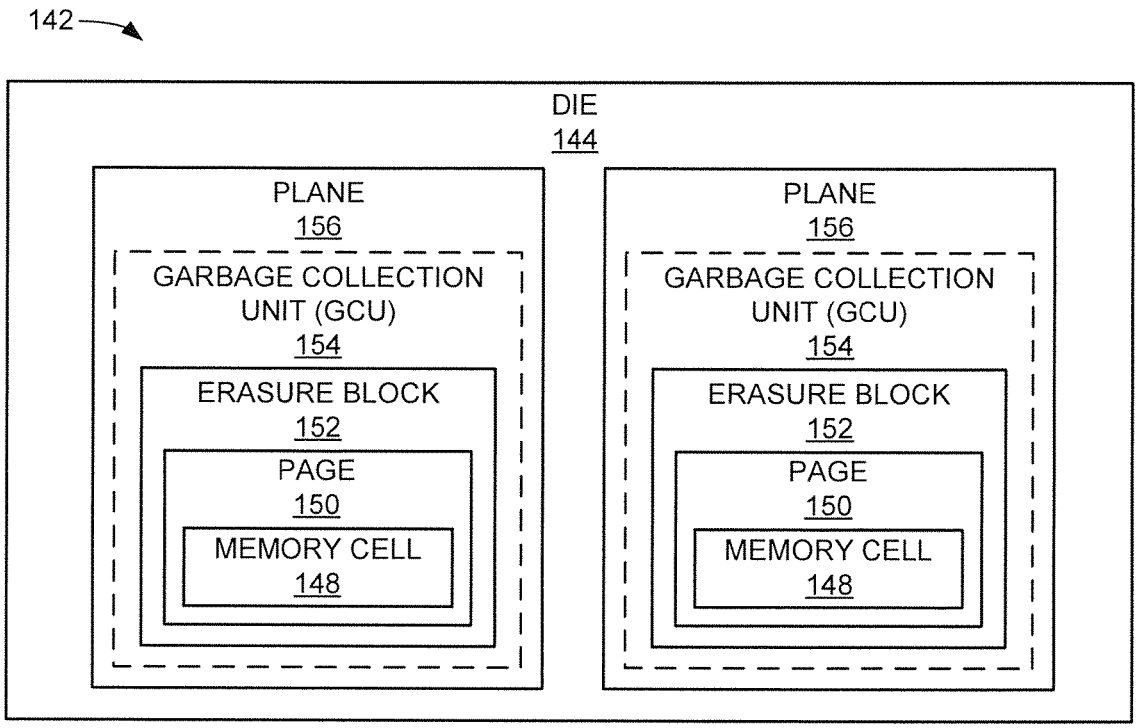
FIG. 3 shows an arrangement of the flash memory of FIG. 2 in some embodiments.

FIG. 3 shows a physical/logical arrangement of the various flash memory dies 144 in the flash memory 142 of FIG. 2 in some embodiments. Each die 144 incorporates a large number of flash memory cells 148. The cells may be arrayed in a two-dimensional (2D) or three-dimensional (3D stacked) arrangement with various control lines (e.g., source, bit, word lines) to access the cells.

Groups of cells 148 are interconnected to a common word line as a "row" of cells to accommodate pages 150, which represent the smallest unit of data that can be accessed at a time. Depending on the storage scheme, multiple pages of data may be written to the same physical row of cells, such as in the case of MLCs (multi-level cells), TLCs (three-level cells), XLCs (four-level cells), and so on. Generally, n bits of data can be stored to a particular memory cell 148 using $2^n$ different charge states (e.g., TLCs use eight distinct charge levels to represent three bits of data, etc.). The storage size of a page can vary; current generation flash memory pages can store, in some cases, 16 KB (16,384 bytes) of user data.

The memory cells 148 associated with a number of pages are integrated into an erasure block 152, which represents the smallest grouping of memory cells that can be concurrently erased in a NAND flash memory. A number of erasure blocks 152 are in turn incorporated into a garbage collection unit (GCU) 154, which are logical structures that utilize erasure blocks that are selected from different dies. GCUs are allocated and erased as a unit. In some embodiments, a GCU may be formed by selecting one or more erasure blocks from each of a population of dies so that the GCU spans the population of dies that make up a particular set.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location, followed by an erasure operation to reset the memory cells to an erased (unprogrammed) state. The recycled GCU is returned to an allocation pool for subsequent allocation to begin storing new user data. In one embodiment, each GCU 154 nominally uses a single erasure block 152 from each of a plurality of dies 144, such as 32 dies.

Each die 144 may further include a plurality of planes 156. Examples include two planes per die as shown in FIG. 3, although other numbers of planes per die, such as four planes per die, etc. can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
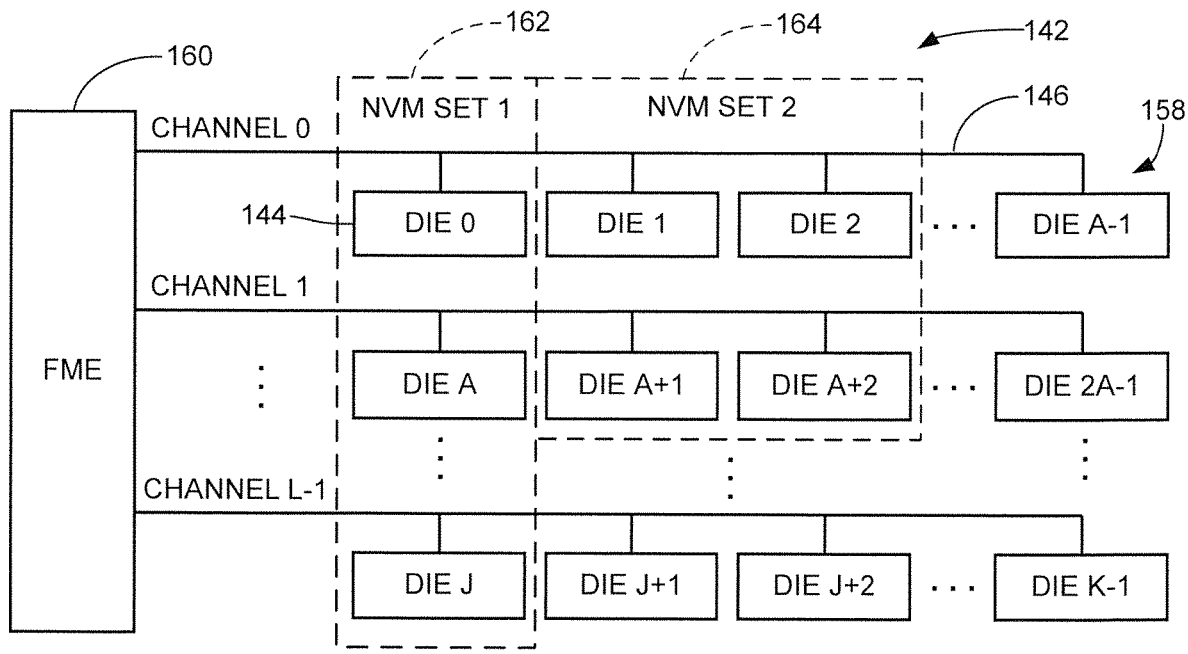
FIG. 4 illustrates the use of channels to access the dies in FIG. 3 in some embodiments.

FIG. 4 shows further aspects of the flash memory 142 in some embodiments. A total number K dies 144 are provided and arranged into physical die groups 158. Each die group 158 is connected to a separate channel 146 using a total number of L channels. A flash memory electronics (FME) circuit 160 of the flash memory module 142 controls each of the channels 146 to transfer data to and from the respective die groups 158. In one example, K is set to 128 dies, L is set to 8 channels, and each physical die group has 16 dies. In this way, any of the 16 dies connected to a given channel 146 can be accessed at a given time using the associated channel. Other respective numbers and arrangements can be used.

In some embodiments, the various dies are arranged into one or more NVM Sets (die sets). A die set represents a portion of the storage capacity of the SSD that is allocated for use by a particular host (user/owner). Die sets are established with a granularity at the die level, so that each die set will encompass a selected number of the available dies 144.

A first set is denoted at 162 in FIG. 4. This first set 162 uses a single die 144 from each of the different channels 146. This arrangement provides fast performance during the servicing of data transfer commands for the set since all eight channels 146 are used to transfer the associated data to service a host access command. A limitation with this approach is that if the set 162 is being serviced, no other NVM sets can be serviced during that time interval. While the set 162 only uses a single die from each channel, the set could also be configured to use multiple dies from each channel, such as four (4) dies per channel for a total of 32 dies.

A second set is denoted at 164 in FIG. 4. This set uses dies 144 from less than all of the available channels 146. This arrangement provides relatively slower overall performance during data transfers as compared to the set 162, since for a given size of data transfer, the data will be transferred using fewer channels. However, this arrangement advantageously allows the SSD to service multiple sets at the same time, provided the sets do not share the same (e.g., an overlapping) channel 146.

Figure 5:
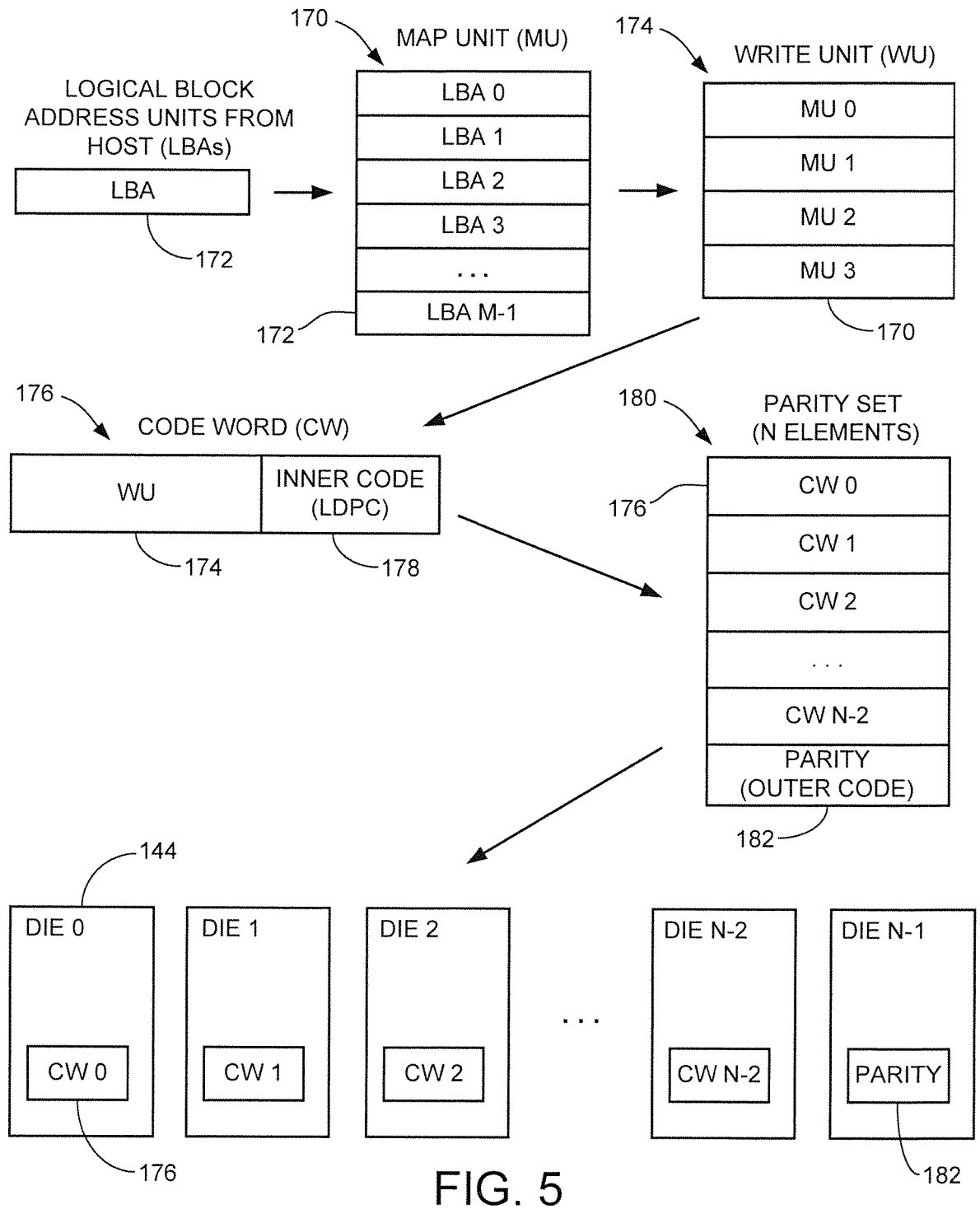
FIG. 5 illustrates a map unit (MU) as a data arrangement stored to the flash memory of FIG. 2.

FIG. 5 illustrates a manner in which user data are stored to the flash memory module 142 in accordance with some embodiments. Map units (MUs) 170 represent fixed sized blocks of data that are made up of one or more user logical block address units (LBAs) 172 supplied by the host. Without limitation, the LBAs 172 may have a first nominal size, such as 512 bytes (B), 1024B (1 KB), etc., and the MUs 170 may have a second nominal size, such as 4096B (4 KB), etc. The application of data compression may cause each MU to have a smaller size in terms of actual bits written to the flash memory 142.

As noted above, in one example each page 150 represents nominally 16 KB of user data capacity. Hence, each set of four (4) MUs 170 will be grouped together to form a write unit (WU) 174 of nominally 16 KB of user data. When dual plane operation is used (see e.g., FIG. 3), each WU can be viewed as constituting eight (8) blocks (MUs) or nominally 32 KB of data since two pages of data can be written simultaneously. Thus, FIG. 5 shows that portion of a WU that is written to a single page.

A code word (CW) 176 is formed by appending, to the WU 174, an inner code value 178. It is contemplated that the inner code constitutes low density parity check (LDPC) codes, although other error correction schemes can be used. The number of code bits will vary, but may be on the order of about 10 KB or so for 16 KB of user data, depending on the construction of the flash memory 142. As will be recognized, LDPC codes enable fast detection and correction of read errors during a read operation. The inner codes 178 may be generated by the LDPC module 138 (see FIG. 2) in preparation of writing the WU 174 to the flash memory.

Some number of code words 176 are grouped together to form a parity set 180 having N elements. Nominally, the value N will be based on the number of erasure blocks 152 in a given GCU 154, although this is not necessarily required. For the present example, it is contemplated that N=32 although other numbers of elements can be used. As shown in FIG. 5, the parity set 180 will have N−1 code words 176 (e.g., N=31) plus an appended parity value 182. Each of the various code words 176 and the associated parity value 182 are written as a different page of data in the GCU. More particularly, the code words and parity values for a given parity data set may be written to the same page and same designated erasure block (e.g., EB 0) across the respective dies, as shown.

The parity value 182 represents outer code and can take any number of forms. Without limitation, in one embodiment the parity value 182 represents the output of an exclusive-or (XOR) function applied to the N−1 code words 176. In this way, the data from the parity set can still be reconstructed even in the event of a single die failure. It follows that nominally 16 KB of parity data protects (16 KB)(31)=496 KB of user data in each parity set, for an overhead ratio of about 3.2%.

The parity sets stored by the SSD 110 are managed using metadata. The metadata provide map structures to track the locations of various data blocks (e.g., MUs 170) to enable the SSD 110 to locate the physical location of existing data within the flash memory 142. During the servicing of a read command, it is generally necessary to locate the physical address within the flash memory 142 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
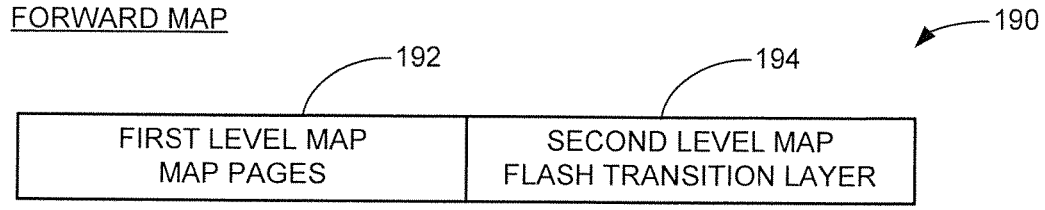
FIG. 6 shows an exemplary format for a forward map used by the SSD in some embodiments.

FIG. 6 shows an example format for a forward map 190 used by the SSD 110 in some embodiments. A two-level map is depicted, although single level or other multi-level maps with three or more levels can be provided as desired.

The forward map 190 includes a first level map 192 and a second level map 194. The first level map 192 provides map pages to identify, for a given range of logical addresses, the entries in the second level map 194. The entries in the second level map 194 provide a flash transition layer (FTL) to generally provide a correlation between the logical addresses of various blocks (e.g., MUs) and the physical addresses at which the various blocks are stored (e.g., NVM set, die, plane, GCU, EB, page, bit offset, etc.).

Forward pointers may be written to the various entries such that, when accessing the map pages and FTL entries, a forward search may take place to locate the final, most current version of a given data block. Once this location is identified, the associated data can be retrieved, etc.

It is generally required that accurate map data be maintained in order to reconstruct the state of the system. A local volatile copy of the map data (or portions thereof) will be maintained in local volatile memory for ease of use by the controller 112. From time to time, the map data may be updated and transferred to the flash memory to provide non-volatile copies of the map information.

Figure 7:
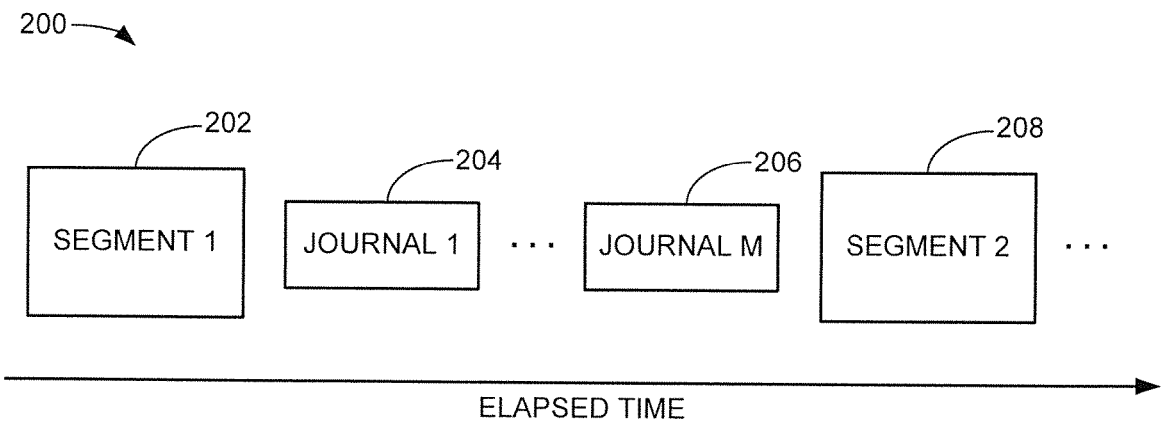
FIG. 7 shows a manner in which the forward map of FIG. 6 is updated over time as a sequence of segments (snapshots) and intervening journal updates in some embodiments.

FIG. 7 shows a sequence 200 to illustrate a manner in which the map data 190 from FIG. 6 is updated to the flash memory 142 over time. A first segment 202 represents an up-to-date representation (snapshot) of the map data at a particular instance in time. Once the segment 202 is written to flash, one or more journal updates such as 204, 206 are written to flash. Each journal update provides a listing of the changes and updates that have occurred since the most recent snapshot. A second segment is shown at 208, which represents the data of the first snapshot plus all of the updates provided by the intervening journals 204, 206.

During operation, the controller 112 (FIG. 2) continuously carries out multiple functions to service the users of the various NVM sets. These functions can be described as (1) hot data transfers, involving the writing of new user data to, or the reading of previously stored user data from, the flash memory 142 in accordance with FIG. 5; (2) cold data transfers, involving garbage collection operations in which current version data are collected and relocated to a new location and a given GCU is erased to place the GCU in condition to accept new data; and (3) map data transfers, where map updates in the form of segments and journals as in FIG. 7 are transferred to the flash memory.

Figure 8:
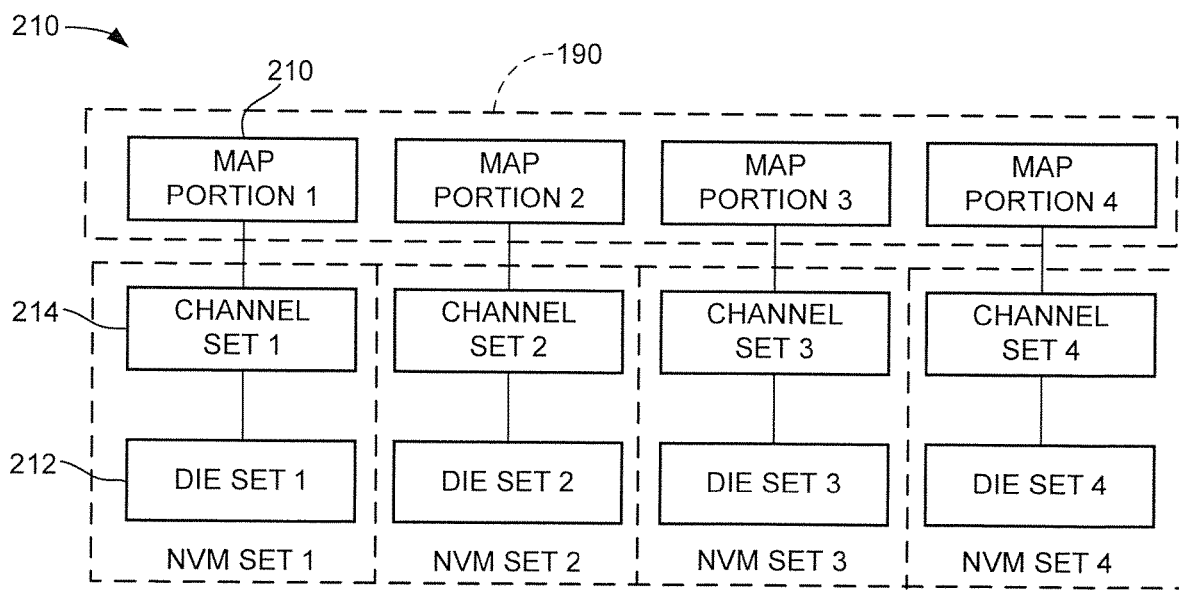
FIG. 8 shows the segregation of the forward map into various map portions for different channel and die sets in accordance with some embodiments.

To this end, various embodiments of the present disclosure divide the forward map 190 into a number of separate sets of map data, each dedicated to describing the user data in each die set. FIG. 8 shows the forward map 190 arranged into four (4) distinct and independent sets of map data, also referred to as map portions 210. The map portions are denoted as map portions 1-4 and serve to describe the user data in four (4) corresponding NVM sets 1-4.

The NVM sets 1-4 each have an associated channel set 214 and group of dies 212. In one example, each of the channel sets 1-4 constitutes two (2) of the eight (8) available channels, although other arrangements can be used so that the channel sets are overlapping and shared by two or more of the NVM sets. The map portions 1-4 each independently describe the user data stored in the associated die sets 1-4.

Figure 9:
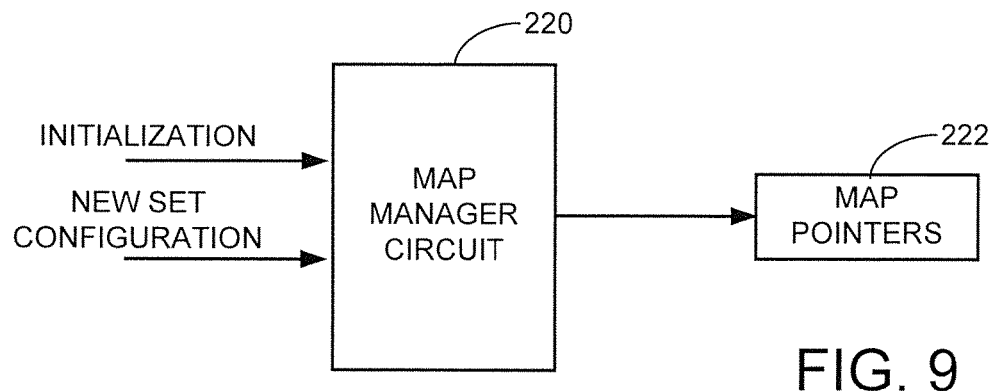
FIG. 9 shows a map manager circuit configured to manage the map portions of FIG. 8 in some embodiments.

FIG. 9 shows a map manager circuit 220 operative to manage the map metadata for the various die sets in the system in accordance with various embodiments. The map manager circuit 220 forms a portion of the controller 112 (FIG. 2) and may be realized using hardware circuitry and/or one or more programmable processors.

At selected times such as during power up initialization events, new set configuration data is supplied to the map manager circuit to indicate that a change in the set ordering has been commanded. In response, the map manager circuit reconfigures the system mapping to accommodate the new die sets. As explained below, the map manager circuit 220 establishes or updates an array of map pointers 222 that are subsequently used to associate the various portions of the map metadata to the new sets.

Figure 10:
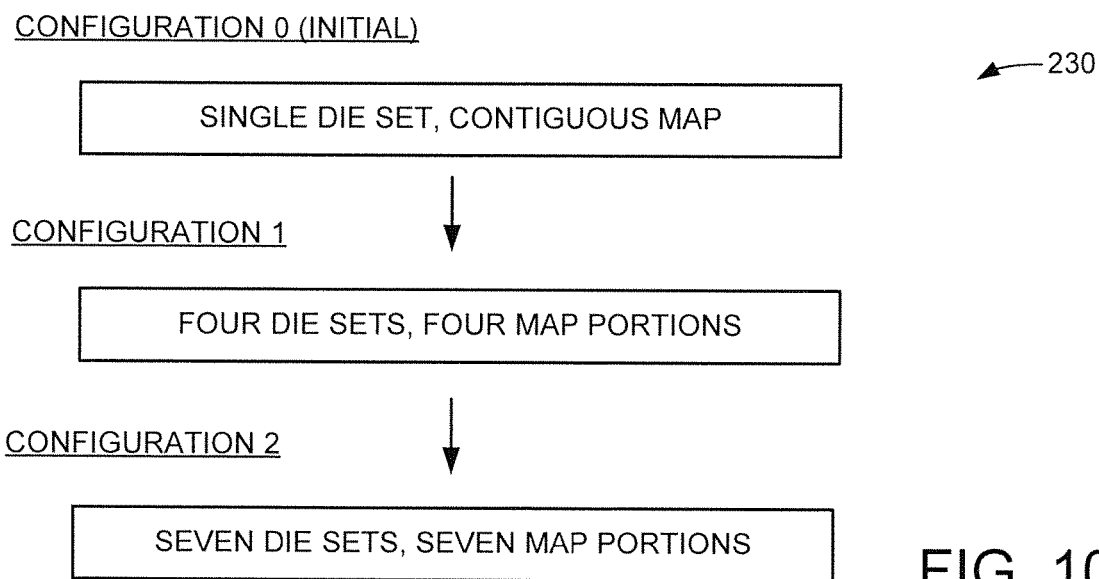
FIG. 10 is a sequence diagram illustrating different set configurations accommodated by the map manager circuit of FIG. 9.

FIG. 10 shows a sequence diagram 230 to illustrate different set configurations that may be applied to the SSD in some embodiments. These configurations are merely exemplary and are not limiting.

An initial configuration is provided during manufacturing and as initially presented for field use. This initial configuration, also referred to as Configuration 0, arranges the dies 144 into a single die set that constitutes the entirety of the available data storage capacity of the drive. In this way, if a user presents credentials to signify the user is an authorized user, that user can fully utilize the full storage capacity of the drive.

A second configuration is denoted as Configuration 1. In this configuration, a total of four (4) equally sized sets have been established. This generally conforms to the diagram of FIG. 8. Using the above example of an 8 channel/128 die SSD, each of the four sets will nominally have 32 die using up to 8 channels.

A third configuration is denoted as Configuration 2. This is a non-standard configuration in which seven sets are established. While normally it is contemplated that the total number of sets in an SSD will be a power of two (e.g., 1, 2, 4, 8, etc.), this is not necessarily required. The map manager circuit 220 can readily accommodate any number of sets up to some predefined limit. It will be appreciated that using a non-standard number of sets will tend to provide the sets with different numbers of dies and overall data storage capacity. This is easily handled by the map manager circuit 220.

Figure 11:
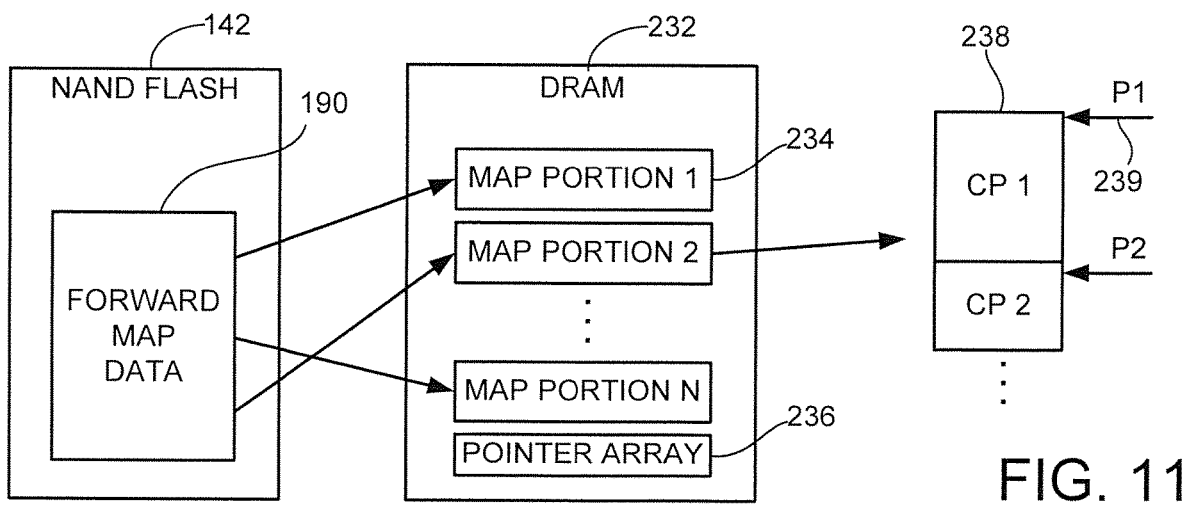
FIG. 11 is a schematic representation of a loading sequence of map data for different configurations from FIG. 10.

FIG. 11 shows a memory diagram to illustrate the management of the map metadata by the map manager circuit 220 to accommodate these and other die set configurations. FIG. 11 shows the NAND flash memory 142 in conjunction with a local volatile memory 232, which in this case comprises DRAM. A non-volatile copy of the forward map 190 is stored in the flash memory. Associated map portions 234 are physically and logically arranged into the DRAM 232 to provide local volatile copies that can be updated as required and then periodically stored back to the flash memory as in FIG. 7. The map pointers 222 from FIG. 9 are denoted in a pointer array 236 in the local memory, allowing the controller to locate the map data.

At this point it will be appreciated that the map data maps the entirety of the user storage space and so represents some grouping of entries, with each entry associated with a different logical element (e.g., MU) that is storable to the flash. It is contemplated that the NAND versions of the forward map data will be stored to the dies and/or die sets that store the associated data. Stated another way, in some embodiments each of the 128 dies in the system can nominally store 1/128 of the total map metadata so that the metadata for a given die is resident on that die. In other embodiments, the map metadata can be stored to one or some of the dies in a physical die group connected to a common channel. In still other embodiments, the map metadata can be stored to a selected number of the dies for the entire system. In some cases, the map metadata will initially begin in one distribution, but this distribution will change as new die sets are established so that the map updates/snapshots are written to appropriate locations. In each of these cases, at least some embodiments configure the system such that the map data portions are recoverable/writable to the die sets described by the map portions.

The forward pointers are used to associate the map data with the associated die sets. This provides a map transition layer such that the controller can identify the map page for a given block using the first level map and identify the flash transition layer using the second level map with the pointers identifying the newly established locations for the entries. Using contiguously stored entries allows the pointers to identify a starting location of the entries which limits the size and numbers of the required pointers.

Accordingly, FIG. 11 shows that each of the map portions 234 may be formed of one or more contiguous portions (CP) 238, such as CP 1 and CP 2. Associated pointers 239, such as pointers P1 and P2, are used to denote the beginning locations of the respective contiguous portions.

Figure 12:
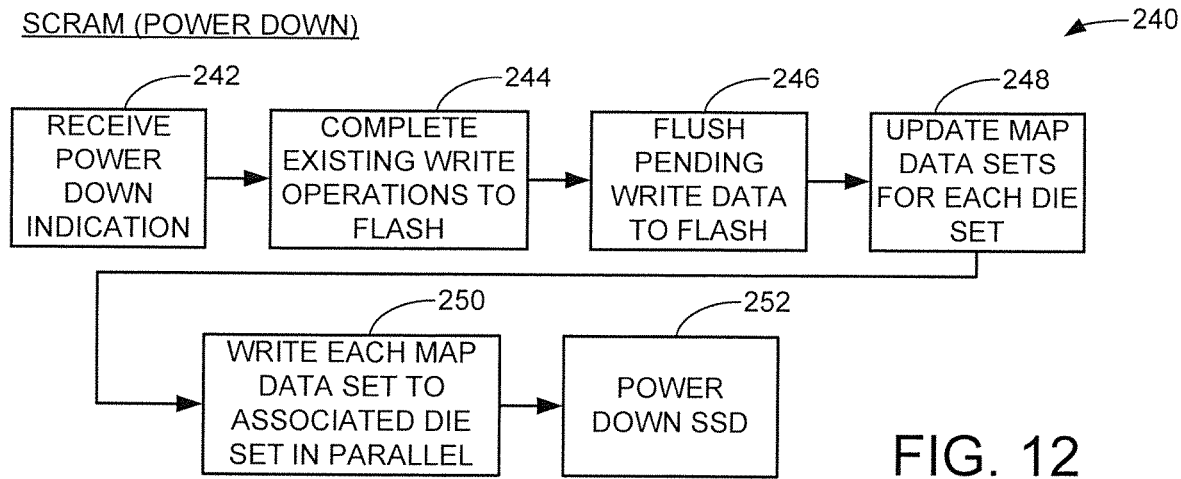
FIG. 12 is a sequence diagram illustrating steps carried out during power down (SCRAM) operations of the SSD in some embodiments.

FIG. 12 is a sequence diagram 240 for a power down (SCRAM) operation carried out by the SSD 110 in some embodiments. A SCRAM generally involves a loss of power to the SSD 110, causing the SSD to prepare for deactivation, including the writing of user data and map data to flash or other non-volatile memory locations. Limited time and energy resources are usually available once a shutdown is initiated.

A power down indication is received at block 242. This indication will be provided by the sensing of an anomalous power event by power circuitry of the device, such as by sensing a drop in the magnitude of a source voltage supplied by an external source, receipt of a power down control signal, etc. It is contemplated that the SSD 110 will include on-board power capabilities to supply short term power to facilitate a safe shut-down of the device, such as in the form of a battery, a capacitor, etc. The power down indication will interrupt the normal servicing of host commands discussed above.

At block 244, the controller will proceed to complete any existing write operations that are ongoing at the time of the power down notification, followed by the flushing of any pending write data to flash at block 246. The associated map portions will be updated to reflect these updated writes. A separate script may be generated to record the operations that were carried out during the shutdown sequence, as desired.

Block 248 shows an updating of the map data sets, which can be carried out concurrently with the flushing operations of block 246. This places the map data in final form prior to the shutdown event. The map data sets are written to each of the associated die sets at block 250. Each die set stores its own map data so that, for example, map portion 1 is written to the die set in NVM Set 1, map portion 2 is written to NVM Set 2, and so on. These transfers can be carried out in parallel depending on the respective arrangements of the die/channel combinations.

Storing the map data to the specific die sets described by the map data ensure that no write conflicts will occur as the device scrambles to flush the user data and the map data to memory. In this scheme, the system will not have to wait for the writing of user data to a first location to be completed before map data associated with some other, second location can be written to the flash memory. Instead, the controller can coordinate the flushing of user data and map data to each NVM set in an orderly fashion well within the remaining power and time budget for the scram sequence.

Once all of the associated data and parameters have been stored, the SSD 110 is allowed to power down at block 252. At this point, the SSD is in a deactivated state, awaiting reinitialization which will now be discussed in FIG. 13.

Figure 13:
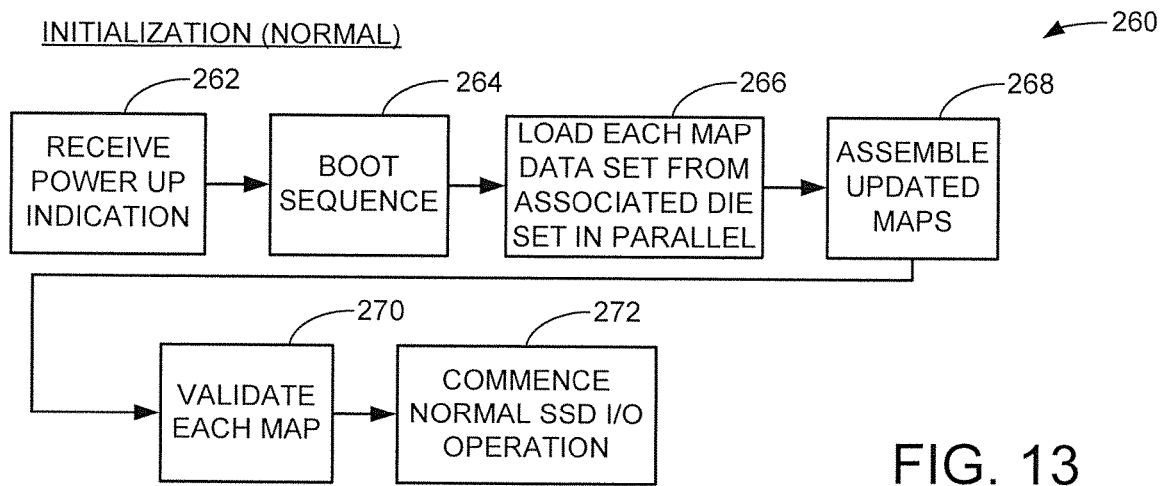
FIG. 13 is a sequence diagram illustrating steps carried out during normal power up (initialization) operations of the SSD in some embodiments.

FIG. 13 shows an initialization (power up) sequence 260. It is contemplated that the power up sequence 260 is a normal sequence in that no set configuration change is detected during the sequence. The sequence commences at 262 where a power up indication is received. This may be provided by the power control circuitry of the SSD 110 sensing the presence of source voltage or other conditions sufficient to sustain operation of the device. A boot sequence is carried out at block 264, which may include a cold or warm boot initialization.

After the boot sequence, the map data sets are loaded to local memory such as the DRAM 232 in FIG. 11, as shown at block 266. The loading of the map portions can be carried out in parallel. It is contemplated albeit not necessarily required that the map data portions may be arranged as segments, updates or other elements that need to be combined in order to generate the final map; if so, these elements are assembled at block 268 to present the available and up-to-date map portions. Each map portion may further be validated at block 270, such as through comparison with a script, reverse directory structures, etc. Once validated, the system is ready to commence normal SSD data transfers, block 272. The pointers 222 of FIG. 9 will enable the system to easily locate and initialize the sets of map data in the local memory.

Figure 14:
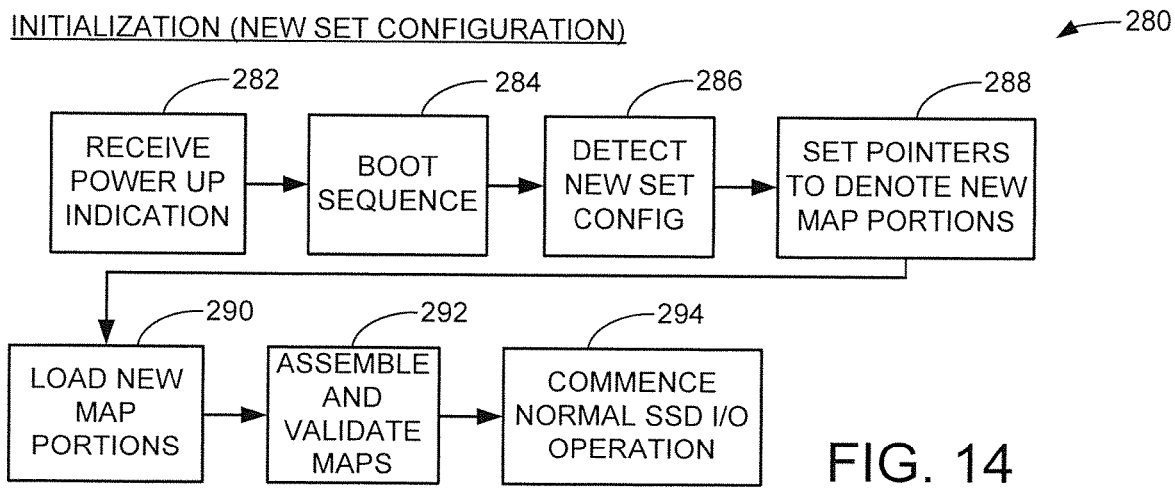
FIG. 14 is a sequence diagram illustrating steps carried out during a power up operation that provides a new set configuration for the SSD in some embodiments.

FIG. 14 shows another initialization sequence 280 carried out in accordance with some embodiments. As before, a power up indication is received at block 282 and a boot sequence is carried out at 284.

As part of the initialization process, a new set configuration indication is received at block 286. This may be supplied by a local external controller or other processing circuit device that communicates with the SSD. The new set configuration information may include the total number of sets, which dies are to be assigned to each set, the total data storage capacity of each set, and other control information such as namespace information, user authentication information, etc. It is contemplated that when a set change is made, at least one of the semiconductor dies 144 will be transitioned from a previous die set to a new die set, in practice, some or all of the dies may undergo reassignment to new die sets.

For each die that is affected in this way, one or more pointers are set at block 288 to identify the new portions. As discussed above, the pointers will associate the resident non-volatile copy of the map data with the associated set, and thereafter serve as a transition layer to enable the system to efficiently identify the map portions from among the overall forward map metadata.

Once the pointers are set, the new map portions are arranged as volatile copies in the local memory (e.g., DRAM 232) at block 290. Using contiguous groups of the map data enables the pointers to point to the beginning of each contiguous section of the map data, as represented in FIG. 11. The map data portions are thereafter assembled and validated at block 292, after which normal operation commences at 294.

It will now be appreciated that the various embodiments present a number of benefits over the art. Providing separate and distinct map portions for each of a number of different NVMe (die) sets can enable more efficient management of the metadata used to control data transfers with each set. The flexible mapping system provided by the map manager circuit allows the pointers to reconfigure the map metadata efficiently for changes in set configurations. While the various embodiments have been described in terms of an SSD in an NVMe environment, other types of storage devices and operational environments can be used as desired. Flash memory is a particularly suitable NVM, but other forms of data storage memory can be used.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
providing a non-volatile memory (NVM) with a plurality of semiconductor memory dies coupled to a controller circuit using a plurality of channels;
arranging the dies into a first die set from a first plurality of the dies to provide a first non-contiguously addressed data storage capacity for user data;
storing a first map portion entirely in the first die set, the first map portion relating logical addresses of user data stored in the first die set to corresponding physical addresses of the first die set where the user data is stored;
rearranging the dies to concurrently form with the first die set a second die set from a second plurality of the dies to provide a second non-contiguously addressed data storage capacity for user data; and
storing a second map portion entirely in the second die set, the second map portion relating logical addresses of user data stored in the second die set to corresponding physical addresses of the second die set where the user data is stored.

2. The method of claim 1, further comprising rearranging the dies to form a third die set from a third plurality of the dies to provide a third data storage capacity for user data, storing a third map portion entirely in the third die set, the third map portion relating logical addresses of user data stored in the third die set to corresponding physical addresses of the third die set where the user data is stored, wherein one of the dies from the second die set is placed in the third die set, and further comprising setting a map pointer array in a volatile memory to associate map data for the at least one die placed in the third die set with its new map portion in the third map portion.

3. The method of claim 1, wherein each die set is formed of semiconductor memory dies connected to each of the parallel channels.

4. The method of claim 1, wherein each die set is formed of semiconductor memory dies that are connected to less than all of the parallel channels.

5. The method of claim 1, wherein each map portion is characterized as a forward map having a transition layer to associate a logical address of each block of the user data of the corresponding die set with a physical address within the die set at which the user data block is stored.

6. The method of claim 1, wherein blocks of the user data are stored to garbage collection units (GCUs) each comprising an erasure block (EB) selected from each die in the associated die set.

7. The method of claim 1, wherein the semiconductor memory dies form a memory space of a data storage device configured in accordance with the NVMe (Non-Volatile Memory Express) specification, wherein each die set is characterized as an NVM set to provide data storage for a separate NVMe user, and wherein each NVM set is accessed using a PCIe (Peripheral Component Interface Express) interface.

8. The method of claim 1, further comprising concurrently storing map data to two different die sets.

9. The method of claim 2, wherein the map pointer array identifies a starting address of a section of map metadata associated with the at least one die placed in the second die set.

10. The method of claim 1, wherein each of the semiconductor memory dies is characterized as a NAND flash memory die comprising a plurality of flash memory cells in which data are stored in relation to accumulated charge in each cell.

11. An apparatus comprising:
a non-volatile memory (NVM) with a plurality of semiconductor memory dies coupled to a controller circuit using a plurality of channels;
a control circuit configured to arrange the dies into a first die set having a first number of the dies to provide a first non-contiguously addressed data storage capacity for user data, and to store a first map portion entirely in the first die set relating logical addresses of user data stored in the first die set to corresponding physical addresses of the first die set where the user data is stored, the control circuit further configured to rearrange the dies to concurrently form with the first die set a second die set from a second plurality of the dies to provide a second non-contiguously addressed data storage capacity for user data, and to store a second map portion entirely in the second die set relating logical addresses of user data stored in the second die set to corresponding physical addresses of the second die set where the user data is stored.

12. The apparatus of claim 11, further comprising rearranging the dies to form a third die set from a third plurality of the dies to provide a third data storage capacity for user data, storing a third map portion entirely in the third data set, the third map portion relating logical addresses of user data stored in the third die set to corresponding physical addresses of the third die set where the user data is stored, wherein one of the dies from the second die set is placed in the third die set, and further comprising a map manager circuit configured to generate a map pointer array in a volatile memory to associate a portion of map metadata for the at least one die placed in the third die set with its new map portion in the third map portion.

13. The apparatus of claim 11, wherein each die set is formed of semiconductor memory dies connected to of the parallel channels.

14. The apparatus of claim 11, wherein at least one of the die sets is formed of semiconductor memory dies that are connected to less than all of the parallel channels.

15. The apparatus of claim 11, wherein each map portion is characterized as a forward map having a transition layer to associate a logical address of each block of the user data of the corresponding die set with a physical address within the die set at which the user data block is stored.

16. The apparatus of claim 11, wherein blocks of the user data are stored to garbage collection units (GCUs) each comprising an erasure block (EB) selected from each die in the associated die set.

17. The apparatus of claim 11, wherein the semiconductor memory dies form a memory space of a data storage device configured in accordance with the NVMe (Non-Volatile Memory Express) specification, wherein each die set is characterized as an NVM set to provide data storage for a separate NVMe user, and wherein each NVM set is accessed using a PCIe (Peripheral Component Interface Express) interface.

18. The apparatus of claim 11, further comprising concurrently storing map data to two different die sets.

19. The apparatus of claim 12, wherein the map pointer array identifies a starting address of a section of map metadata associated with the at least one die placed in the second die set.

20. The apparatus of claim 11, wherein each of the semiconductor memory dies is characterized as a NAND flash memory die comprising a plurality of flash memory cells in which data are stored in relation to accumulated charge in each cell.

21. A method comprising:
providing a non-volatile memory (NVM) memory with a plurality of semiconductor memory dies coupled to a controller circuit using a plurality of channels;
arranging a subset of the dies into a first die set configured to store user data associated with a first user;
in response to an initialization operation to transition a data storage device comprising the NVM from a deactivated mode to an operationally ready mode, rearranging the dies to form a different, second die set configured to store user data associated with a different, second user, at least one die from the first die set placed in the second die set; and
setting a map pointer in memory to identify map data associated with the at least one die placed in the second die set.

22. An apparatus comprising:
a non-volatile memory (NVM) memory with a plurality of semiconductor memory dies coupled to a controller circuit using a plurality of channels;
a control circuit configured to arrange a subset of the dies into a first die set configured to store user data associated with a first user, the control circuit further configured, in response to an initialization operation to transition a data storage device comprising the NVM from a deactivated mode to an operationally ready mode, to rearrange the dies to form a different, second die set configured to store user data associated with a different, second user, at least one die from the first die set placed in the second die set; and
a map manager circuit configured to generate a map pointer in a memory to identify a portion of map metadata associated with the at least one die placed in the second die set.

* * * * *